United States Patent [19]

Anderson

[11] 3,920,344

[45] Nov. 18, 1975

[54] MITER JOINT STRUCTURE

[75] Inventor: Richard N. Anderson, Owensboro, Ky.

[73] Assignee: V. E. Anderson Mfg. Co., Owensboro, Ky.

[22] Filed: Mar. 12, 1973

[21] Appl. No.: 340,555

[52] U.S. Cl. .................................. 403/401; 52/656
[51] Int. Cl.² ..... B25G 3/36; E04G 7/00; F16B 7/18
[58] Field of Search ........... 403/401, 402, 231, 403, 403/382; 52/656, 475, 285, 758 H, 753 D; 160/381

[56] References Cited

UNITED STATES PATENTS

| | | | |
|---|---|---|---|
| 2,736,403 | 2/1956 | Gwynne | 52/656 X |
| 2,916,112 | 12/1959 | Kiehl | 403/401 X |
| 3,081,852 | 3/1963 | Mendelsohn | 52/656 X |
| 3,202,245 | 8/1965 | Tarte | 403/401 |
| 3,469,360 | 9/1969 | Peterson et al. | 403/401 X |

FOREIGN PATENTS OR APPLICATIONS

| | | | |
|---|---|---|---|
| 1,001,811 | 1/1957 | Germany | 403/402 |

Primary Examiner—Werner H. Schroeder
Assistant Examiner—Wayne L. Shedd
Attorney, Agent, or Firm—Whittemore, Hulbert & Belknap

[57] ABSTRACT

A miter joint and the method of forming the miter joint, wherein one member of which the joint is formed is provided with offset or abutment portions at the end thereof at predetermined points along the width thereof adapted to engage the side of the other member from which the miter joint is formed, with the ends of the members miter cut and aligned to form the miter joint, and screws extend transversely through the adjacent end of the other member and into the one member, whereby on drawing the screws tight, the offset portions of the one member bears against the inside of the other member to prevent sliding of the ends of the members along the miter joint.

7 Claims, 5 Drawing Figures

MITER JOINT STRUCTURE

CROSS-REFERENCE TO RELATED APPLICATIONS

This application is related to application Attorney No. 52,405, entitled "Building Structure" of a common inventor, filed concurrently herewith, bearing Ser. No. 340,556.

BACKGROUND OF THE INVENTION

1. Field of the Invention

The invention relates to miter joints generally in any material and refers more particularly to mitered corner joints between elongated metal extrusions in window and door construction including integral abutment structure which is easy to manufacture and is efficient in holding the joints in alignment during fabrication.

2. Description of the Prior Art

In the past, to form mitered corners, the members from which the mitered corners have been formed have been cut at required angles so that the ends when abutted together form the desired miter joint, after which the ends are secured together, such as by screws extending transversely through the end of one of the members to be mitered and longitudinally extending into the end of the other extrusion. With such structure, if the screws are not drawn tight enough, the miter joint is loose. If the screws are drawn too tight, the ends of the members forming the miter joint slip along the joint, whereby an improperly aligned miter joint is formed. The forming of miter joints has, therefore, in the past required a considerable amount of skill which has increased the expense of fabrication of properly aligned miter joints.

SUMMARY OF THE INVENTION

In accordance with the invention, there are provided notches or offset or abutment portions in one of a pair of members to be connected in a miter joint at the mitered end thereof, the ends of which offset portions abut the side of the other member to be formed into the miter joint at the mitered end of the other member. Thus, when the ends of the members are secured together by screws extending transversely through the other member and longitudinally into the one member, the screws may be drawn tightly without fear of the miter cut ends of the members moving along the miter joint formed thereby due to the pressure provided therebetween by the screws since such movement is opposed by the end of the offset portion of the end of the one member abutting the side of the other member.

DESCRIPTION OF THE PREFERRED EMBODIMENT

Figure 1:
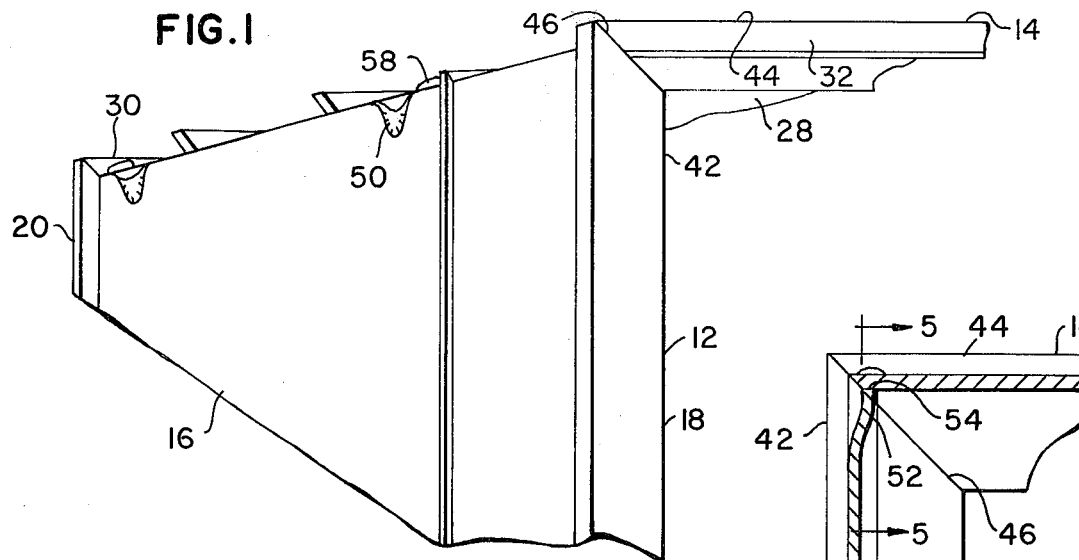
FIG. 1 is a perspective view of a miter joint at the corner of an aluminum frame for a sliding door or the like including structure for facilitating fabrication thereof, in accordance with the method of the invention.

As shown in FIG. 1, the miter joint 10 is between the jamb 12 and head 14 of the frame for sliding door structure, as shown in more detail in the above referenced related patent application. The jamb 12 and head 14 are aluminum extrusions.

Figure 4:
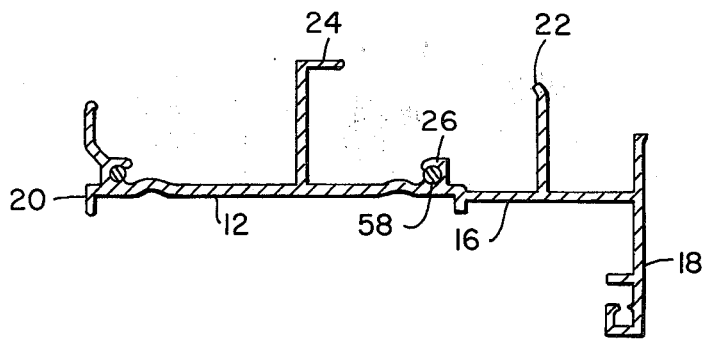
FIG. 4 is a partial section view of the miter joint illustrated in FIG. 1, taken substantially on the line 4—4 in FIG. 2.

The jamb extrusion 12, as best shown in FIG. 4, is an elongated member including a web portion 16 and flange portions 18 and 20. In addition, the flange portions 22 and 24 extend perpendicularly to and depend from the flange portion 18 over substantially the entire length of the web 16. Screw runners 26 are also provided on the jamb 12 and extend longitudinally of the web 16, as shown in FIG. 4.

Figure 5:
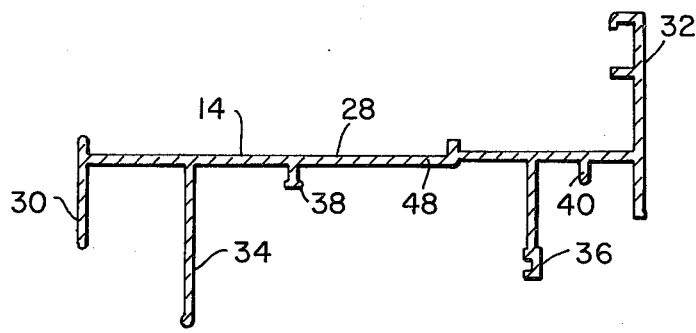
FIG. 5 is a partial section view of the miter joint illustrated in FIG. 1, taken substantially on the line 5—5 in FIG. 3.

The head extrusion 14, as shown best in FIG. 5, again includes a web portion 28, flanges 30 and 32 extending perpendicularly to the web portion 28 at the edges thereof, and the flanges 34 and 36 along with the ribs 38 and 40 extending perpendicularly to the web 28 and depending therefrom for receiving sliding doors and a screen, as set forth in the above referenced patent application. The head extrusion 14 further includes screw openings extending through the web portion thereof adjacent the ends, as shown in FIG. 5.

Figure 3:
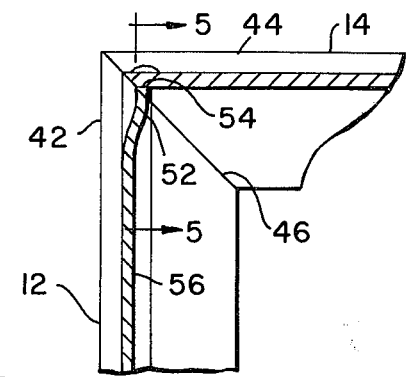
FIG. 3 is a partial section view of the miter joint illustrated in FIG. 1, taken substantially on the line 3—3 in FIG. 2.

The adjacent ends 42 and 44 of the jamb and head extrusions 12 and 14 are miter cut at an angle of for example 45° with respect to the extent of the elongated jamb and head extrusions 12 and 14 to provide a miter joint 46 with the ends 42 and 44 properly aligned and abutted against each other, as particularly shown in FIGS. 1 and 3.

In the past, the extrusions 12 and 14 have been secured together in such miter joints by screws 58 extending through screw openings 48 in the head extrusion 14 and into the screw runners 26 in the jamb extrusion 12. However, with such construction, as the screws are tightened, the ends 42 and 44 of the extrusions 12 and 14 tend to become misaligned due to slipping of the extrusions along the miter joint 46 due to force applied by the screw.

Accordingly, unless particular care has been used in fabrication, such miter joints have in the past been either loose because of insufficient tightening of the screws or misaligned because of overtightening of the screws.

Therefore, in accordance with the invention, depressions, notches or offsets 50 are formed in the web 16 at the end 42 of the extrusion 12. The depressions 50 offset a portion 52 of the end 42 of the web 16. The end 54 of the offset portions 52 of the web 16 thus form abutments in engagement with the inner surface 56 of the end 44 of the web 28. Relative sliding of the ends 42 and 44 of the extrusions 12 and 14 along miter joint 46 is thus resisted, while the screws 58 are drawn tight to provide a tight, perfectly aligned miter joint.

As shown in FIG. 3, as the depressed portions 52 are offset, the end 54 must move in a slight arc to aid in the proper dimensioning thereof to abut the surface 56 of the web 28. In addition, the beveled end of the depressed portions 50 of the web 16 are deformed in assembly to provide a bearing or abutment surface such as 54 on the end of the depressed portion 50 of the web 16.

If a square end is desired on the depressed portion 50 of the web 16, as shown in FIG. 3, the end of the depressed portion 50 may be notched, as shown in FIG. 3. Also, the end may be deformed by means of a hammer or the like to provide a substantially square end by hitting the beveled edge end of the depressed portion 50 with a hammer or the like prior to assembly.

Figure 2:
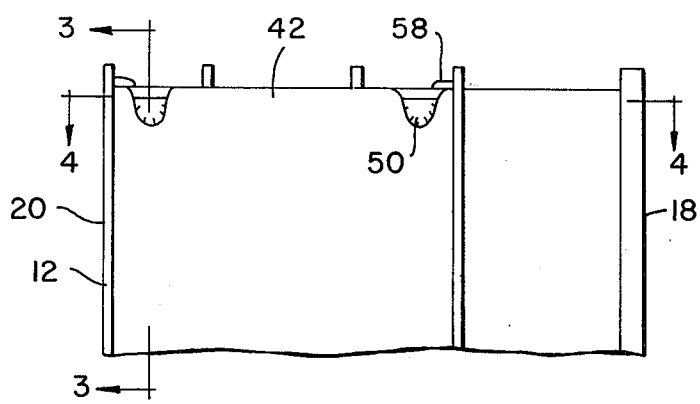
FIG. 2 is an elevation view of the miter joint as illustrated in FIG. 1.

As shown best in FIG. 1, a plurality of depressed portions 50 may be provided across the width of the extrusion 12. Also, as shown for example in FIGS. 2 and 4, the depressed portions 50 are best positioned immediately adjacent the screw runners 26 since the screw runners 26 and depressed portions 50 cooperate with the screws 58 in aligning the miter joint.

As will be readily seen from reviewing the drawings and in light of the above disclosure, the miter joint disclosed is relatively simple and therefore is easy to manufacture so as not to add greatly to the expense of the miter joint. Further, miter joints formed by the method indicated above with the structure disclosed will be perfectly aligned and require little time to fabricate.

While one embodiment of the miter joint of the invention has been disclosed, other embodiments and modifications are contemplated. It is the intention to include all embodiments and modifications as are defined by the appended claims within the scope of the invention.

What I claim as my invention is:

1. A pair of members joined at one end of each of them in a full miter joint, the one ends of which are completely miter cut so that the one ends abut each other over the entire surface of the one ends thereof in the miter joint when properly aligned, abutment means at the one end of one of the members extending in the direction of extent of the other of the members from the adjacent side of the one of the members abutting the adjacent side of the other member adjacent the one end thereof with the one ends of the members aligned in the miter joint, and fastening means extending transversely through the one end of the other member from the other side thereof and longitudinally into the one member and drawing the adjacent side of the other member tight against the abutment means at the one end of the one of the members to maintain a properly aligned, tight miter joint.

2. Structure as set forth in claim 1 wherein the abutment means is integral with the one member at the one end thereof.

3. A pair of elongated members each having a web portion from which flange portions extend perpendicularly thereto which flange portions are terminated at one end of each of the members in a complete miter cut, the miter cut ends of the members being complementary so that the one ends of the members fully abut in a miter joint when properly aligned, means securing the one ends of the elongated members together to form the miter joint including means for preventing misalignment of the elongated members on securing the one ends of the elongated members together comprising an offset portion in the web portion of one of the elongated members at the one end thereof, which offset portion includes an end which abuts the side of the web portion of the other elongated member adjacent the end of the one elongated member at the one end of the other elongated member.

4. Structure as set forth in claim 3 and further including a screw runner extending longitudinally of the one elongated member at the one end thereof and wherein the means for securing the one ends of the elongated members together comprises screw means extending transversely through the web portion of the other elongated member at the one end thereof and into the screw runner in the one end of the one elongated member.

5. Structure as set forth in claim 4 wherein the end of the offset portion of the one elongated member is substantially square.

6. Structure as set forth in claim 5 wherein the offset portion of the web of the one elongated member and the screw runner are adjacent each other.

7. Structure as set forth in claim 6 wherein there are at least two offset portions and two adjacent screw runners and screw means connecting the miter cut one ends of the elongated members together.

* * * * *